May 10, 1927.  1,628,332

J. REID

SAFETY STOP DEVICE

Original Filed Feb. 20, 1924    2 Sheets-Sheet 1

Inventor
John Reid
By Knight Bros.
Attorneys

May 10, 1927.
J. REID
SAFETY STOP DEVICE
Original Filed Feb. 20, 1924  2 Sheets-Sheet 2
1,628,332
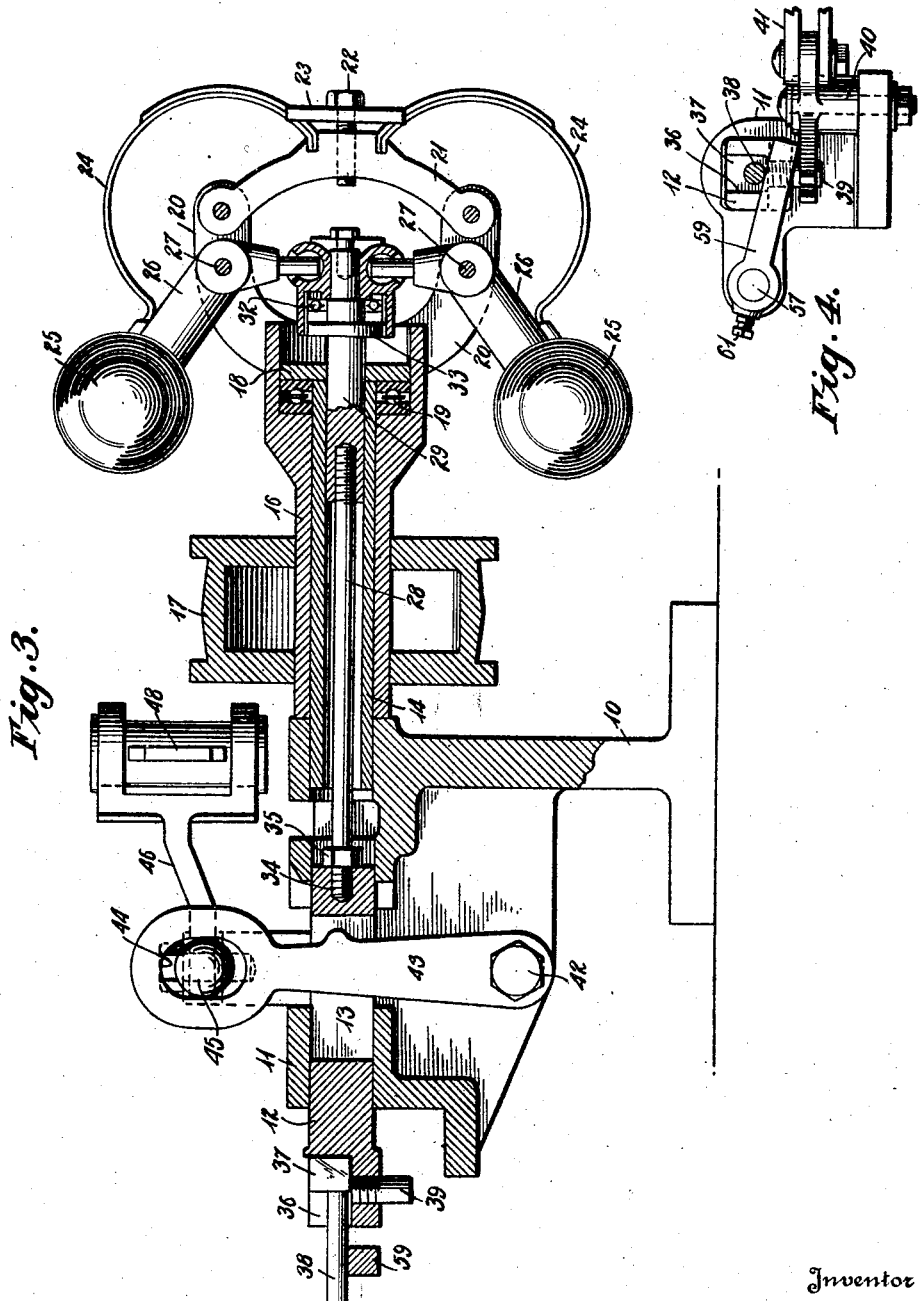
Inventor
John Reid
By Knight Bro.
Attorneys Patented May 10, 1927.

1,628,332

UNITED STATES PATENT OFFICE.

JOHN REID, OF OIL CITY, PENNSYLVANIA.

SAFETY STOP DEVICE.

Original application filed February 20, 1924, Serial No. 694,146. Divided and this application filed September 29, 1924. Serial No. 740,674.

This invention relates to safety stop devices used in connection with speed regulating devices and has for its object to improve generally the construction of speed regulators and governors adapted for use in connection with gas and oil engines.

An object of the invention is to provide an arrangement of this character the construction of which offers the possibility of disconnecting the governor from the throttle of the engine with which it is associated upon the breaking of the belt, whereupon in such an emergency the engine will be immediately brought to a stop.

This application is a division of my copending application, Ser. No. 694,146, filed February 20th, 1924.

Figure 1:
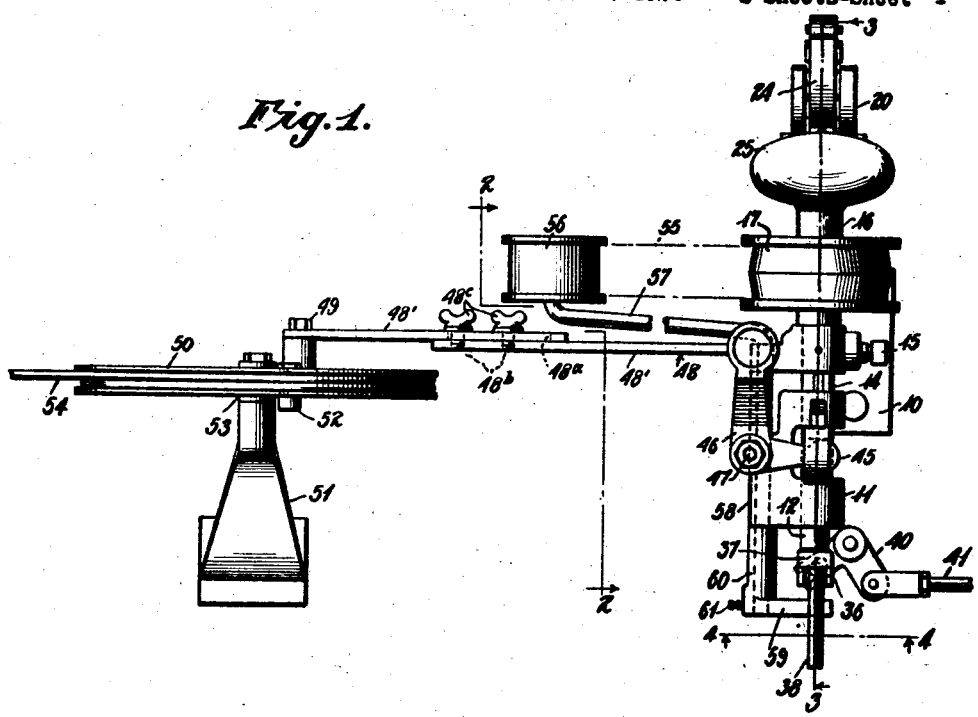
Figure 2:
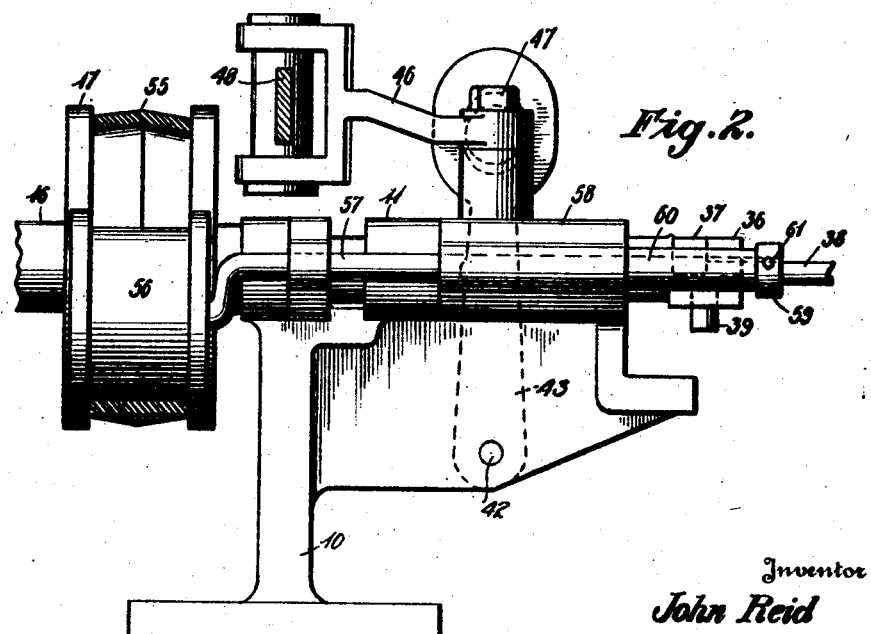

Other objects of the invention as well as the novel features of construction will be made more apparent as this description proceeds, especially when considered in connection with the accompanying drawings wherein:

Fig. 1 is a top plan view of a speed regulating device constructed in accordance with my invention, Fig. 2 is a sectional view taken substantially on the plane indicated by line 2—2 in Fig. 1, Fig. 3 is a sectional view taken substantially on the plane indicated by line 3—3 in Fig. 1, and Fig. 4 is a view taken substantially on the plane indicated by line 4—4 in Fig. 1.

Referring now more particularly to the drawings wherein like reference characters indicate like parts, it will be noted that there is illustrated a supporting stand or bracket 10 preferably secured to the engine by any suitable means, this stand being formed with a sleeve-like guiding portion 11 in which there is mounted for reciprocation a slide 12 formed intermediate its length with a slot 13 for a purpose to be more fully hereinafter described.

Fixed to the stand 10 is a spindle 14, this spindle fitting in one end of the sleeve-like portion 11 the stand and being secured therein by means of the set-screw 15. A sleeve-like body 16 is mounted upon the spindle 14 and carries a belt-pulley 17. The upper end of the member 16 is recessed to accommodate a head 18 formed on the spindle 14 and between this head 18 and the bottom of the recess there is inserted a thrust bearing 19.

Projecting at diametrically opposed points from the end of the body 16 is a pair of arms 20 bridged by a member 21, this member being centrally apertured and threaded to receive a bolt 22, which in turn engages a pressure block 23 bearing on the ends of a pair of springs 24 as clearly illustrated in Fig. 1. A pair of governor balls 25 are mounted by means of bell-cranks 26 pivoted as at 27 to the arms 20. The outer ends of the springs 24 engage the governor balls 25 and tend to normally swing them inwardly toward their axis of rotation. The tension of the springs 24 may be regulated by the pressure of the pressure block 23 thereon.

Extending centrally of the spindle 14 is a rod 28 having a threaded connection at one end with a member 29 carrying on its upper end a governor block 30, the ends of the bell-cranks 26 being reduced as at 31 whereby a loose connection between these bell-cranks and the governor block is effected. The governor block is rotatable relative to the shaft 29, there being a thrust bearing 32 interposed between the governor block and a collar 33 formed on the shaft 29.

The other end of the rod 28 has a threaded connection as at 34 with the slide 12, a locknut 35 being provided whereby this connection may be adjusted and locked for reasons made apparent hereinafter. The end of the slide 12 is bifurcated and slotted as at 36 to receive the headed end 37 of a control rod 38, preferably connected to the throttle or fuel control of the engine. The end of the slide is also preferably provided with a stud 39 to which there is connected one end of a bell-crank 40 the other end of which is connected to a control rod 41 for the water valve of the engine. Therefore as the slide 12 is actuated by the centrifugal motion imparted to the governor balls 25, the fuel and water to the engine will also be regulated.

Pivotally mounted as at 42 upon a web-like extension of the stand 10 is a lever 43 formed in its free end with an opening 44 adapted to receive the ball-shaped end 45 of a bell-crank lever 46 pivoted as at 47 to the stand 10. A link 48 is connected to the end of the bell-crank 46, the other end of this link being pivotally connected as at 49 with a control wheel 50 mounted upon a stand 51 bolted or secured in any other convenient manner to the engine or engine base.

The control wheel 50 is provided with a stop pin 52 adapted to engage a stop 53 provided on the stand 51 thereby limiting the rotation of the wheel 50. The control wheel 50 may be actuated in any suitable manner, means preferably being provided for rotating the wheel from a distant point. In the present illustrative embodiment of the invention there is shown a cable 54 wound around the wheel, it being obvious that various means may be provided for actuating the cable to rotate the wheel 50.

The link 48 is preferably formed of two sections 48' adjustably connected by means of slots 48ª arranged in one of the sections 48' which cooperate with studs 48ᵇ projecting from the other section 48, these studs being threaded to receive thumb-nuts 48ᶜ. By making the connecting link 48 adjustable the relative position of the parts can be regulated so that upon operation of the wheel 50 the governor rod 28 and consequently the slide 12 may be actuated to a greater or less extent.

Resting upon the belt 55 which passes around the pulley 17 is an idler pulley 56 carried by an idler pulley lever 57, journalled in the portion 58 of the stand 10. A knock off dog 59 is provided with a sleeve-like extension 60 which fits over the end of the idler pulley lever 57 and is secured thereto by means of a set screw 61. The end of the knock off dog 59 is adapted to lie under the control rod 38 as illustrated in Figs. 1 and 2.

Obviously should the belt 55 break, the pulley 56 which rests thereon will fall by gravity thus rotating the portion of the idler pulley lever 57 mounted in the bracket 58, this rotary motion actuating the dog 59 to disengage the end of the rod 38 from the forked end 36 of the slide 12 whereupon the governor will be disconnected from the fuel control means of the engine.

When it is desired to increase the speed of the engine beyond that permitted by the governor the wheel 50 is rotated which in turn will displace the link 48 thus locking the bell-crank lever 46 which in turn will rock the lever 43 about its pivot 42 to displace in a horizontal direction the slide 12, this movement of the slide tending to open the throttle to the engine, to thus increase its speed. Obviously the parts may be maintained in this position as long as desired; the governor balls being ineffective while the parts are held in this position. Obviously the amount of displacement of the slide 12 depends upon the adjustment of the connecting link 48 and it will be furthermore apparent that as the wheel 50 is rotated to bring the stop pin 52 into engagement with the stop 53, the wheel 50 and consequently the parts controlled thereby will be locked when it has reached the end of its adjustment owing to the fact that the natural movement of the link 48 is downward and further movement is prevented by engagement of the stops 52—53.

The slot 13 formed in the slide 12 is of sufficient dimensions to permit a reciprocation of this slide during the normal operation of the governor, it being obvious that as the speed of the governor increases the balls 25 thereof will swing outwardly by reason of the centrifugal action thus moving the shaft 29 and rod 28 inwardly and displacing the slide 12 in the direction to cut off the supply of fuel to the engine. As mentioned hereinbefore the pressure exerted by the springs 24 upon the governor balls 25 may be regulated by adjusting the pressure block 23 by means of the bolt 22.

The provision of the thrust bearings 19 and 32 insures an efficient operation of the device as obviously the greatest bearing strains are imparted to the governor at these points. The length of the connection between the governor balls and the throttle operating rod 38 may be regulated to insure the proper control of the throttle by the adjustable connection between the rod 28 and the slide 12, the connection between these parts being locked by means of a locknut 35.

As mentioned hereinbefore the connection between the throttle control rod 38 and the slide 12 is a readily detachable one and this disconnection between these parts is effected each time the pulley belt 55 breaks, owing to the engagement with the belt of the idler pulley 56 which will drop by gravity when unsupported by the belt to thus actuate the idler pulley lever 57 which in turn, oscillates the knock off dog 59 for forcing the end of the rod 38 from engagement with the forked end of the slide 12.

While one illustrative embodiment of the invention has been shown and described herein in some detail it will be readily apparent that various modifications of the structure may be resorted to without departing from the spirit and scope of this invention and to this end I reserve the right to make such changes in the details of this invention as may come within the purview of the accompanying claims.

Having thus described my invention, what I claim is:

1. In combination, a governor, a valve control member, a releasable connection between said governor and valve control member, said governor being driven by a belt gearing, an idler pulley associated with said belt gearing, said idler pulley being displaceable when said belt gearing breaks and means operatable by the displacement of said idler pulley for disengaging said releasable connection between said governor and valve control member.

2. In combination, a governor, a valve control rod, a governor slide connected to said governor, said slide being formed with means releasably engaging said valve control rod, a belt gearing for operating said governor, an idler pulley resting upon said belt, a knock off dog connected to said idler pulley and arranged adjacent the connection between said governor slide and valve control rod, said idler pulley being displaceable when said belt breaks whereby said knock off dog will break the connection between said governor slide and valve control rod.

The foregoing specification signed at Oil City, Pa., this fifth day of September, 1924.

JOHN REID.